May 3, 1927.
L. S. JONES ET AL
1,627,096
TILE COATING MACHINE AND PROCESS
Filed March 16. 1925    2 Sheets-Sheet 1
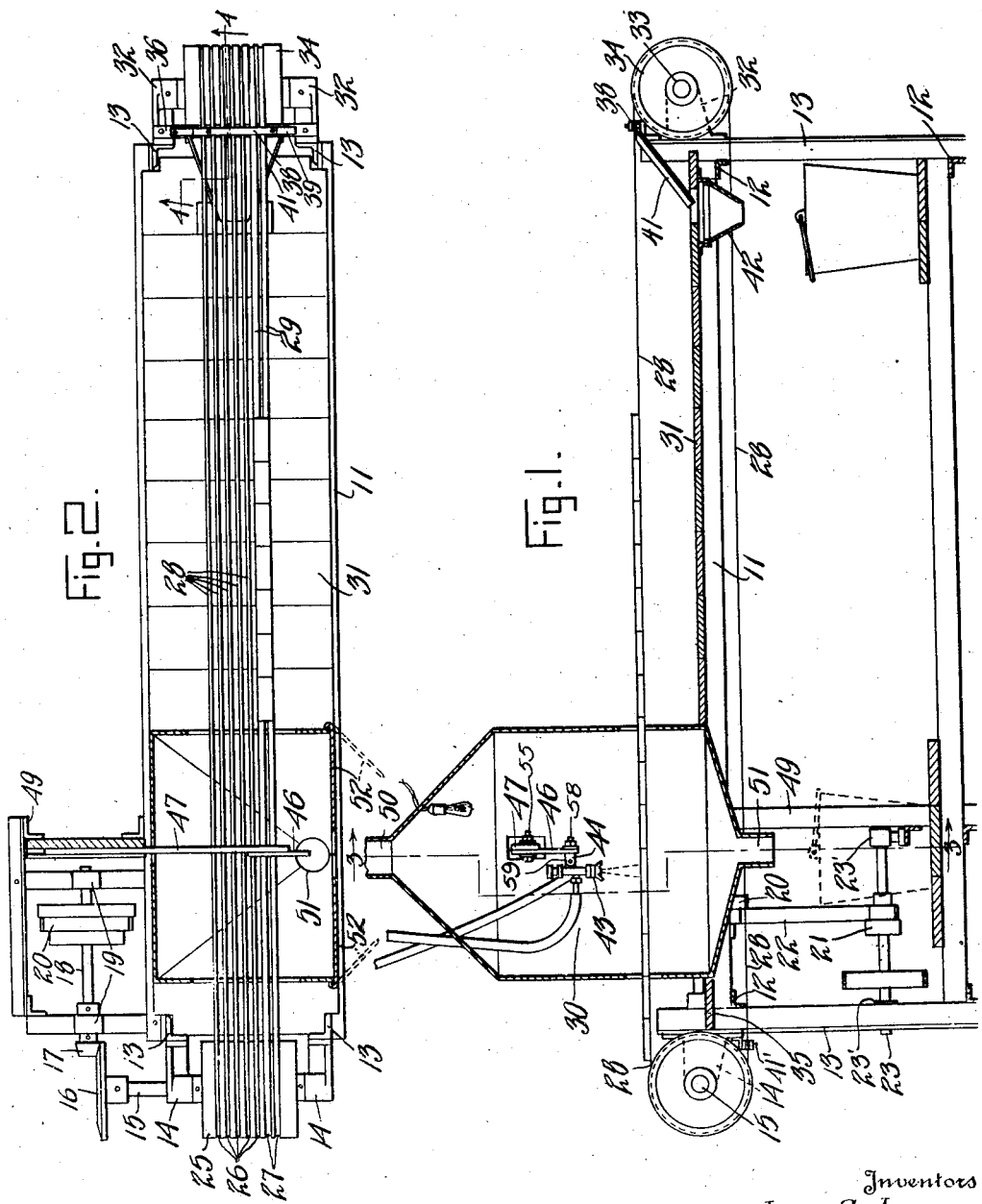
Inventors
Louis S. Jones,
Garfield W. Fisher,
Carl G. Henrikson
By
Attorney May 3, 1927. 1,627,096
L. S. JONES ET AL
TILE COATING MACHINE AND PROCESS
Filed March 16, 1925 2 Sheets-Sheet 2
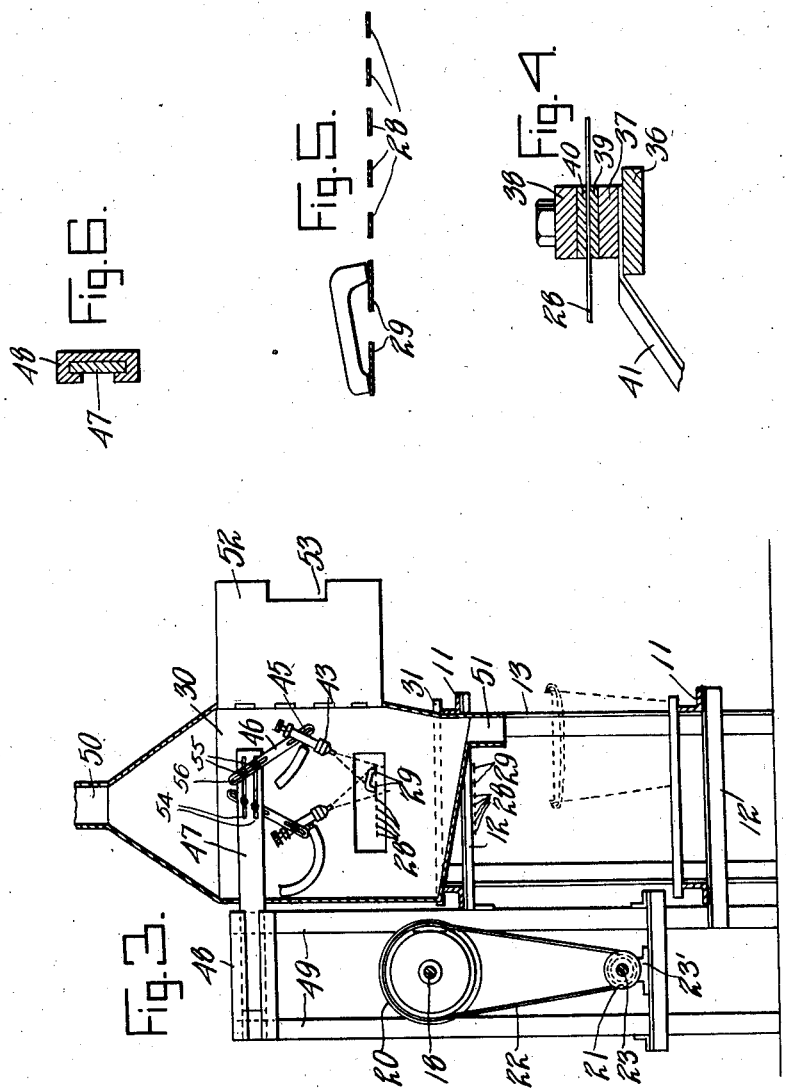
Inventors
Louis S. Jones,
Garfield W. Fisher
Carl G. Henrikson
By
Attorney Patented May 3, 1927.

1,627,096

UNITED STATES PATENT OFFICE.

LOUIS S. JONES, GARFIELD W. FISHER, AND CARL G. HENRIKSON, OF ANDERSON, INDIANA, ASSIGNORS TO THE NATIONAL TILE COMPANY, OF ANDERSON, INDIANA, A CORPORATION OF INDIANA.

TILE-COATING MACHINE AND PROCESS.

Application filed March 16, 1925. Serial No. 16,025.

Our said invention relates to tile coating or glazing machines intended to coat tile of irregular shapes, including trim tile, with a liquid which when fired becomes a glaze, the liquid being applied from above in the form of an atomized spray consisting of a glazing compound mixed with water to make it thin enough for use in an atomizer. It is an object thereof to apply the coating or glazing material or compound in the form of a descending spray.

Other objects are to control and adjust the thickness of the coating, to render it more uniform in thickness than heretofore, and to make the process cheaper and more expeditious. We have found that tile treated by our method can be picked up and handled without damage to the coating by the fingers of the operatives immediately after the completion of the spraying operation. Apparently this is due partly to the drying of the atomized particles of the compound by the air used in generating the spray as well as by the surrounding air and perhaps partly to the fact that the coating is made very uniform by our method so that it dries equally all over the coated object.

Our method enables the operator feeding the tile to inspect the tile for defects in the body thereof before it goes on the machine. It further enables the operator to place each tile in exactly the same position on the bands, or belts, thereby allowing each tile to pass under the sprayer in exactly the same position, consequently causing the glaze on each tile to be more uniform in thickness, whether the tile be flat or of irregular shape.

We attain these objects by the mechanism illustrated in the accompanying drawing in which, Fig. 1 is a vertical longitudinal section of the entire machine;

Fig. 2, a plan view of the machine with part thereof in section;

Fig. 3, a vertical transverse section on line 3—3 of Fig. 1;

Fig. 4, a detail section on line 4—4 of Fig. 2 of a stripping or cleaning device;

Fig. 5, an enlarged section through the bands showing how the tile are carried thereon and passed through the spraying chamber; and Figure 6, a detail section of the support for the spraying devices.

The rails 11, cross-bars 12 and the legs 13 constitute the main framework of the machine. Rotating in bearings 14 at one end of the frame is a shaft 15 driven by a bevel gear 16 mounted thereon. Gear 16 is driven by a bevel pinion 17 mounted on a shaft 18 rotating in bearings 19, shaft 18 being equipped with a cone or step pulley 20 operating in conjunction with a cone pulley 21 by means of belt 22 for the purpose hereinafter described; cone pulley 21 is mounted upon a shaft 23 which is driven by a pulley 24, driven by any suitable means. Shaft 23 is carried in bearings 23'.

Mounted on shaft 15 is a pulley or drum 25 having narrow grooves 26 and wide grooves 27 in which grooves run endless bands or wires 28 and wider bands 29; these bands pass through a spraying chamber 30 and over a delivery table 31 (in the direction of the arrow). Mounted in brackets 32 is a shaft 33 on which rotates an idler pulley 34 similar in all respects to pulley 25, over which bands 28 and 29 return to pulley 25. In returning, these bands pass beneath table 31 and spraying chamber 30. Between pulley 25 and the spraying chamber 30 a board 35 is located practically on the same level with table 31. Table 31 and the bottom of spraying chamber 30 and board 35 coact to prevent particles of broken pieces of tile from falling on the return portion of the bands below, so that these particles may not be caught between the bands and the pulley 25.

Before passing over pulley 34 the bands pass through a cleaning device (Figs. 1, 2 and 4) for removing from them such coating material as may adhere to them while they are exposed to the spray which falls on them whenever a space is left between the tile or alongside the tile during the operation of the machine. The aforesaid cleaning device is mounted upon a bridge 36 and is composed of strips of metal 37 and 38 between which are clamped two strips 39 and 40 of some soft material, as rubber or felt. The bands 28 and 29 pass between the strips 39 and 40 which, due to their flexibility conform to the sectional contour of the bands thereby thoroughly cleaning them before they pass on over pulleys 34 and 25. Clamped between strip 37 and bridge 36 is a trough 41 serving to carry away the coating material thus removed from the bands and leading it to a second trough 42 mounted beneath table 31, which second trough leads this material to a point at one side of the returning bands where it may be collected in suitable containers for re-use. A cleaning device of this nature is also used in advance of the pulley 25, as can be seen in Fig. 1 at 41'.

Within chamber 30 are mounted conventional spraying devices 43 which spray the mixture of glazing compound and compressed air downward onto the tile as they pass through the spraying chamber lying face upward on the bands. The spraying devices 43 are mounted on swivels 44 which are secured in slots 45 in pairs of fingers 46 bolted to an arm 47, said arm 47 being slidably mounted in a guide 48 supported on the upper ends of legs 49. With this type of mounting it will be seen that spraying devices can be adjusted to spray the tile from various positions and angles, so that tiles of irregular shape will receive the proper thickness of glaze over their entire surfaces. Slots 54 in the support 47 provide for lateral and pivotal adjustment of the bars 46 which are secured in place by means of bolts 55 passing through elongated slots at 56 in the upper ends of the bars 46. These bars are also provided with slots at their lower ends at 45 through which pass bolts 58 on the swivel blocks 44 which are provided with pins at 57 so that the nozzles may be adjusted in one way by movement about pins 59 as a pivot and in another direction by movement on bolts 58 as a pivot. It will be seen from this that a wide range of adjustment is provided for the nozzles so that the spray of glazing material can be applied more heavily to one part of an irregularly shaped trim tile than to another part of the tile in a single operation or can be equally distributed over all parts of irregularly shaped tiles of the character described. Particles of spraying compound light enough to float in air are drawn upward and out of the spraying chamber through pipe 50 by any conventional suction mechanism. This is to prevent these particles from polluting the air outside of the spraying chamber.

The part of the glazing compound which is sprayed past or alongside the tile and between the bands is collected in the bottom of the spraying chamber, and conducted through an opening 51 to suitable containers in which it may be collected and re-used.

Spraying chamber 30 is provided with doors 52 arranged to be swung out of the way so that certain tile having exceedingly irregular shapes may be sprayed by hand, the operator standing in front of spraying chamber while performing the work within. Suitable lighting arrangements are provided to illuminate the interior of spraying chamber 30 and small openings 53 in doors 52 permit the work to be observed during its normal automatic travel through the machine without opening the doors.

In this particular machine two of the bands 29 are made considerably wider than the balance of the bands 28, for two reasons; the one reason being, that they are better adapted on account of their strength to carry tiles with narrow supporting parts, such as illustrated in Fig. 5; and the other being that the bulk of the work is done at the right-hand side of the machine where the bands are shown, wherefore it is desirable to render that side of the belt stronger than the other to take care of the heavy wear and weight. The width and spacing of the bands 28 and 29 is designed to meet the requirements of various sizes and shapes of tile and is not restricted to that shown in the drawings. Drums with a plain surface may be used in conjunction with a device for keeping the belts properly spaced.

There are two different modes of operation that may be performed in this machine, one mode or process being that in which the tile are fed continuously in successive contact with each other through the machine, as shown in the drawings, the tile being placed on the bands as they run off the pulley 25. The coated tile after passing beneath the spraying devices are removed as they are fed over table 31 and placed in saggers for firing, during which operation they may be further inspected for defects in the tile or the coating of glaze. The other operation is one in which the tile are placed on the bands and fed through the machine with considerable space between them so that they may be picked up by an operator standing in front of the chamber 30, thereupon sprayed by hand and replaced upon the bands and upon emerging from chamber 30 be removed as they are fed over table 31.

In the first operation described it will be seen that as the tile are fed continuously through the spraying chamber under the spraying devices it becomes necessary that the speed with which they move be controlled or adjusted so that the glaze coating is of the proper thickness. For this purpose the machine is provided with the cone pulleys 20 and 21, whereby the speed of the bands may be accelerated or reduced. We do not, however, confine ourselves to the use of cone pulleys as other means may be provided for controlling and adjusting the speed.

The use of this machine assures a uniform glaze on all tile regardless of shape, size, porosity, density, hardness or softness of the tile. It will be obvious to those skilled in the art that the machine may be modified in various particulars without departing from the spirit of the invention and that it is not limited to the two modes of operation described but may be used in other ways and for other purposes, therefore I do not limit myself to what is shown in the drawings and described in the specification but only as indicated in the appended claims.

Having thus fully described our said invention what we claim as new and desire to secure by Letters Patent, is:

1. A combination machine for treating tile of heterogeneous form comprising a series of parallel wires providing a traveling belt, bands of greater cross section than the wires at one side of said belt extending parallel to said wires, a chamber through which the belt travels, means for producing within the chamber a spray of glazing compound, doors in the chamber adjacent said bands, and pulleys at opposite sides of the chamber for guiding the elements of said belt in spaced relation to each other, substantially as set forth.

2. A machine for treating tiles of irregular shape comprising a conveyor, a plurality of nozzles above said conveyor for spraying glazing compound on the tiles, means above the conveyor supporting the nozzles for independent lateral adjustment transversely of the conveyor, and means to fix the nozzles in adjusted position, substantially as set forth.

3. A machine for treating tiles of irregular shape comprising a conveyor, a plurality of nozzles above said conveyor for spraying glazing compound on the tiles, means above the conveyor supporting the nozzles for independent vertical and lateral adjustment relatively to the conveyor, and means to fix the nozzles in adjusted position, substantially as set forth.

4. A machine for treating tiles of irregular shape comprising a conveyor, a plurality of nozzles above said conveyor for spraying glazing compound on the tiles, means above the conveyor supporting the nozzles for independent pivotal, lateral and vertical adjustment relatively to the conveyor, and means to fix the nozzles in adjusted position, substantially as set forth.

5. A machine for treating tiles of irregular shape comprising a conveyor, a plurality of nozzles above said conveyor for spraying glazing compound on the tiles, means above the conveyor supporting the nozzles for independent pivotal and lateral adjustment relatively to the conveyor, and means to fix the nozzles in adjusted position, substantially as set forth.

6. A machine for treating tile comprising a plurality of traveling strands with open spaces between them, means to hold such strands in constant spaced relation, a chamber through which the strands travel, means for producing within the chamber a spray of glazing compound, and means conforming to the sectional contour of the strands for cleaning the upper run of said strands after they pass the coating chamber, substantially as set forth.

7. A machine for treating tile comprising a plurality of traveling strands with open spaces between them, means to hold such strands in constant spaced relation, a chamber through which the strands travel, means for producing within the chamber a spray of glazing compound, and flexible means adjacent the end of each run adapted to conform to the sectional contour of each strand for removing glazing compound adhering thereto, substantially as set forth.

8. A machine for treating tile comprising a plurality of traveling strands with open spaces between them, means to hold such strands in constant spaced relation, a chamber through which the strands travel, means for producing within the chamber a spray of glazing compound, and means for varying the speed of travel of the strands for controlling the thickness of the layer of liquid applied to the tile, substantially as set forth.

9. In a machine adapted to treat tiles of irregular shape, a conveyor, a fixed arm above the conveyor, a finger secured to the arm for lateral, vertical and pivotal adjustment relatively thereto, and a nozzle pivotally supported on the arm, said nozzle being adjustable lengthwise of said arm, substantially as set forth.

In witness whereof, we have hereunto set our hands at Anderson, Indiana, this 2nd day of March, A. D. nineteen hundred and twenty-five.

LOUIS S. JONES.
GARFIELD W. FISHER.
CARL G. HENRIKSON.